No. 634,848. Patented Oct. 10, 1899.
C. S. COURSON.
DEVICE FOR PREVENTING ELECTROLYSIS IN PIPES.
(Application filed Apr. 1, 1899.)

(No Model.)

WITNESSES:
Jas. P. Dawley
H. M. Dawley

INVENTOR,
Clinton S. Courson.
By H. A. Toulmin,
ATTORNEY.

THE NORRIS PETERS CO., PHOTO-LITHO., WASHINGTON, D. C.

UNITED STATES PATENT OFFICE.

CLINTON S. COURSON, OF SPRINGFIELD, OHIO.

DEVICE FOR PREVENTING ELECTROLYSIS IN PIPES.

SPECIFICATION forming part of Letters Patent No. 634,848, dated October 10, 1899.

Application filed April 1, 1899. Serial No. 711,341. (No model.)

*To all whom it may concern:*

Be it known that I, CLINTON S. COURSON, a citizen of the United States, residing at Springfield, in the county of Clark and State of Ohio, have invented certain new and useful Improvements in Devices for Preventing Electrolysis in Pipes, of which the following is a specification, reference being had therein to the accompanying drawings.

This invention relates to certain new and useful improvements in means for preventing electrolysis in pipe-lines.

The object of this invention is to provide means for preventing electrolysis of pipes and pipe-joint packing in water, gas, and oil pipe-lines; and to that end my invention has reference to a non-electricity-conducting packing which is fitted between the meeting ends of pipes, so as to break contact between them, and thereby prevent the flow of electricity along the line of pipe where such packing is used.

My invention also relates to details of construction hereinafter appearing and particularly pointed out in the claims.

Figure 1:
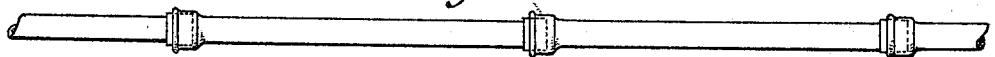
Figure 2:
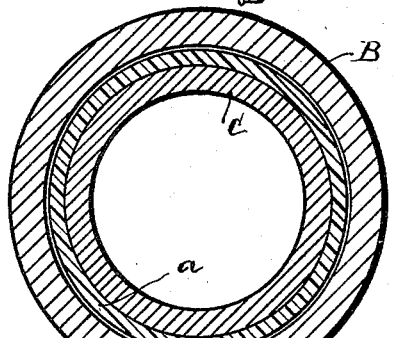
Figure 3:
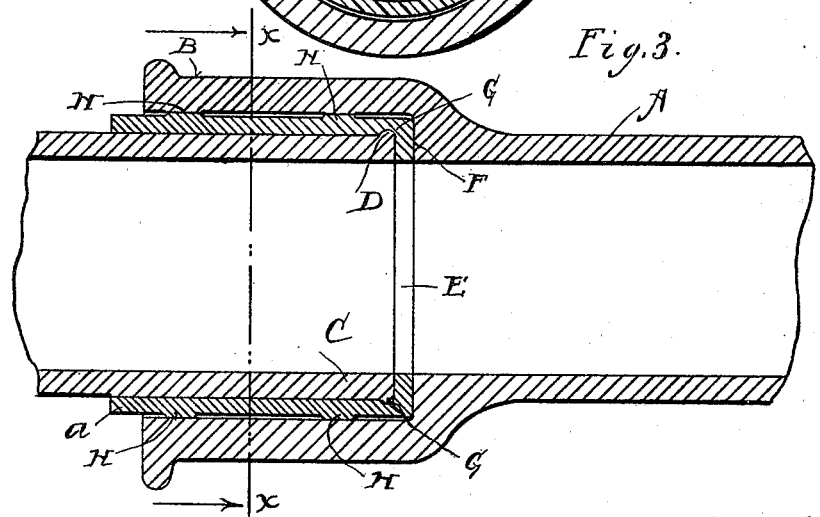
Figure 4:
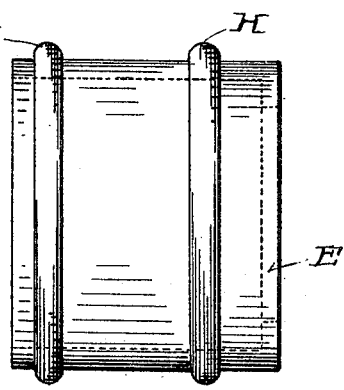
Figure 5:
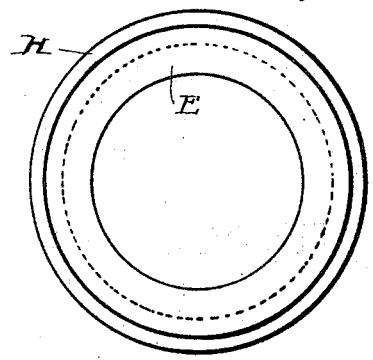

In the accompanying drawings, on which like reference-letters indicate corresponding parts, Figure 1 represents a portion of a pipe-line with my improvement applied thereto; Fig. 2, a sectional view on the line $x\,x$ of Fig. 3; Fig. 3, a longitudinal sectional view; Fig. 4, a detail plan view of my packing, and Fig. 5 an end view of the same.

Since the advent of trolley-cars, telephones, &c., water-pipes, gas-pipes, and other pipes embedded in the ground have been materially damaged and in some cases have been eaten entirely through by the electricity, such electricity also causing the pipe-joints packed with lead and a like material to become disintegrated, due to what is termed "electrolysis." Such electrolysis of water-pipes of this character has become so general that simple and efficient means for preventing it is practically a necessity. With my present invention I have effectually overcome this difficulty by a very simple device, as will hereinafter appear.

The letter A represents a portion of a length of pipe—say a water-pipe, such as used for conducting water through streets of cities, &c. One end of this pipe is enlarged to form what is termed the "bell," as shown at B. This bell is of sufficient diameter to permit of the ready insertion of the small end of an adjacent pipe, such as shown at C. At the end of this meeting pipe it will be seen that there is a bead or projection D. About such end is adapted to fit a packing $a$, formed of rubber or other non-electricity-conducting material. At its inner end this packing has an inward projection or flange E, which fits down over the end of the pipe C and against the inner wall F of the bell B, thus effectually insulating one pipe from the other, so that electricity cannot pass from one to the other. It will be observed that the packing has an annular groove G adjacent to the flange F in the inside. This annular groove is for the reception of the bead D. In order that the packing, together with the pipe C, may be readily slipped within the bell, I provide one or more annular extensions H on the outside of said packing, as clearly seen in Figs. 3 and 4, so that said packing will not rub throughout its entire length against the bell; but the annular extensions snugly fit within the bell and prevent any leakage between said bell and packing. The flange E between the meeting ends of the pipes prevents leakage at such ends.

Thus it will be seen that with my invention, aside from preventing the flow of electricity through the pipes, the packing $a$ is simple and effective and does away with the expense of calking and the filling of the joints with molten lead, together with tow-packing. Such method of packing is very expensive and is more or less defective unless properly calked, as this calking is accomplished with great difficulty, especially when working in a narrow trench, when it frequently happens that joints will leak when put under high pressure.

In practice, if so desired, this method of insulating joints may be applied at intervals in a pipe-line; but I prefer to use it at every joint, for the reason that short circuits are more readily avoided.

Referring again to the packing it will be seen that it projects a short distance beyond the end of the bell. This is for the purpose of more readily preventing connection for conducting the electricity between the end of such bell and the pipe C. Of course it will be understood that this packing arrangement may be used in connection with various kinds of pipe other than those employing a bell.

Having thus fully described my invention, what I claim as new, and desire to secure by Letters Patent, is—

1. In a device for preventing electrolysis in pipe-lines, a packing having an inturned flange at one end, an interior annular groove adjacent to said flange, and one or more external annular projections therefrom, substantially as shown and described.

2. In a device for preventing electrolysis in pipe-lines, the combination with adjacent ends of pipes in said line, one of which is adapted to fit within the other, such other being enlarged to receive it, a packing having an inturned annular flange adapted to fit upon one end of the first of said pipes and having its flange projecting over the edge of such pipe, said packing projecting beyond the enlarged end of the adjacent pipe when said pipes are connected with each other, substantially as shown and described.

In testimony whereof I affix my signature in presence of two witnesses.

CLINTON S. COURSON.

Witnesses:
F. M. HAGAN,
W. M. McNAIR.